Jan. 9, 1968     J. E. CLARKE     3,362,502
ABOVE THE FLOOR VEHICLE LIFT
Filed July 14, 1966     2 Sheets-Sheet 1
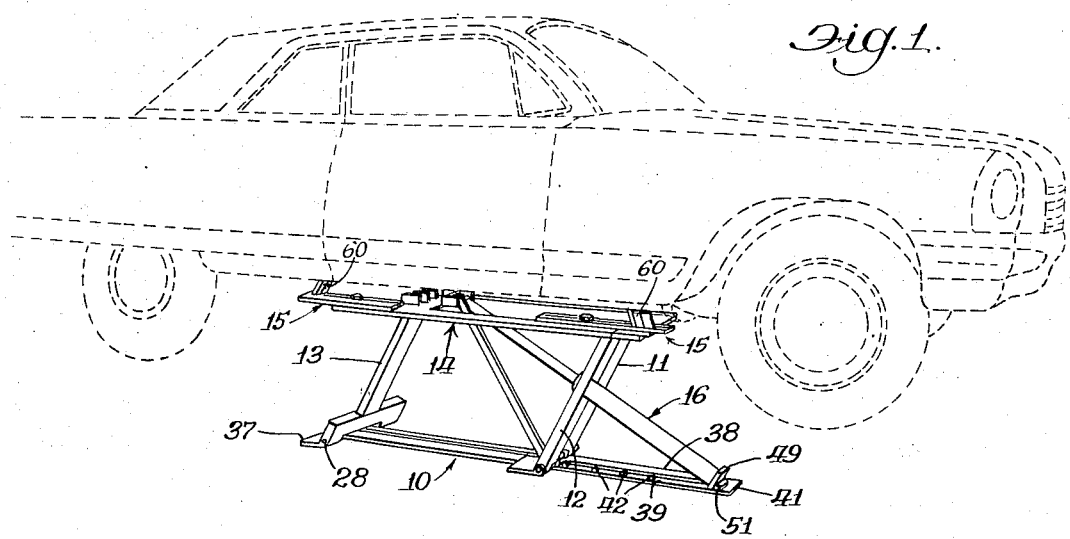
Inventor:
Jesse E. Clarke
By Darbo, Robertson &
Vandenburgh Attys.

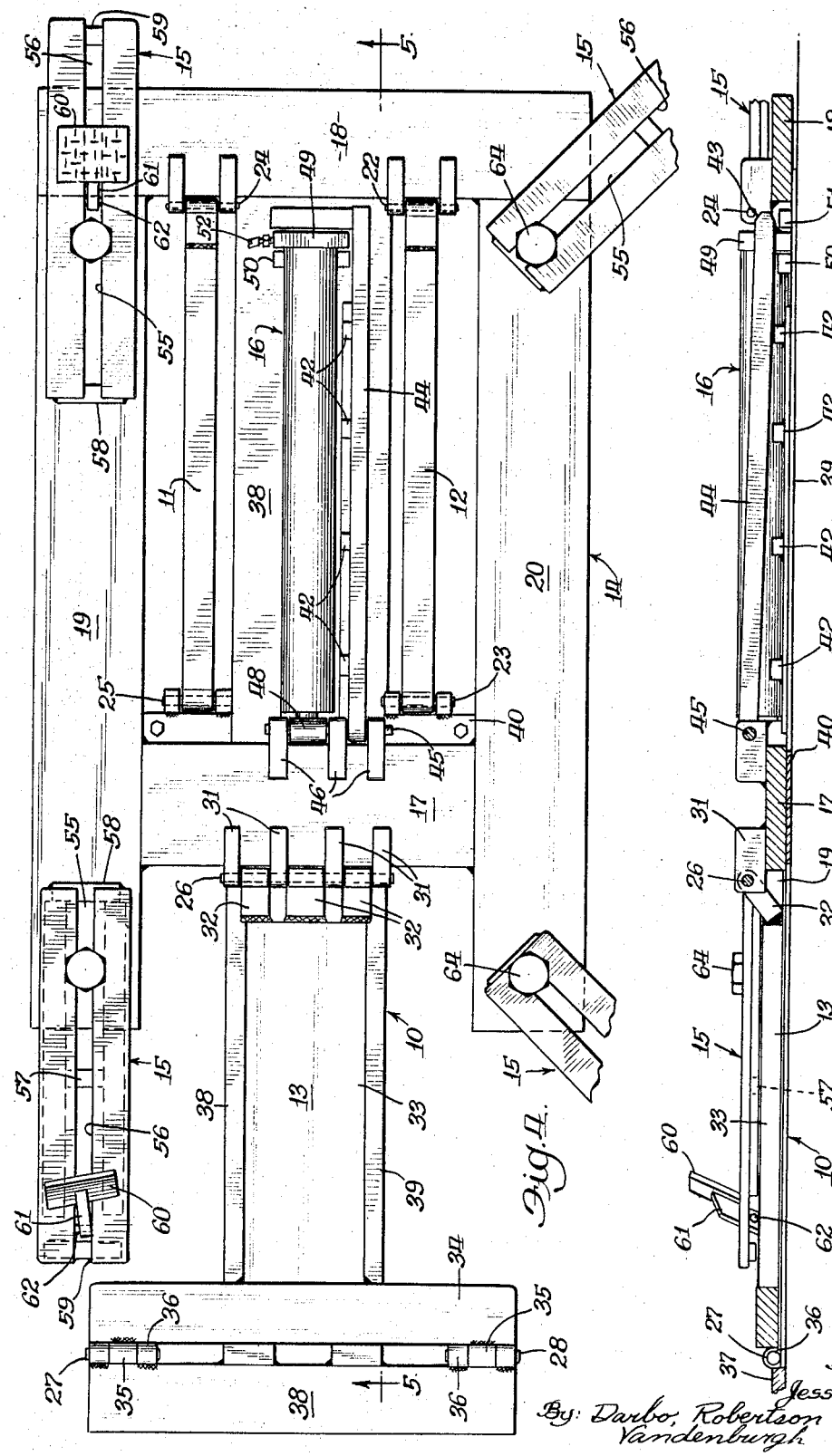

United States Patent Office 3,362,502
Patented Jan. 9, 1968

3,362,502
ABOVE THE FLOOR VEHICLE LIFT
Jesse E. Clarke, Hinsdale, Ill., assignor to Autoquip Corporation, Chicago, Ill., a corporation of Illinois
Filed July 14, 1966, Ser. No. 565,273
12 Claims. (Cl. 187—8.72)

ABSTRACT OF THE DISCLOSURE

An above the floor vehicle lift is provided wherein a vertically moving subframe is affixed to the top of a plurality of parallelly positioned pivoting levers. The point of attachment between the top of the levers and the subframe is inboard of the points at which the vehicle load is imposed upon the subframe. A hydraulic lift is connected between the subframe and the floor to control the pivotal position of the levers and thus the height of the subframe from the floor. The pads for contacting the vehicle are slotted arms fitting about a pin vertically mounted on the subframe.

---

The present invention relates to improvements in a vehicle lift of the type wherein pivoted supporting members are employed to support the vertically moving bolster, and the following disclosure thereof is offered for public dissemination upon the grant of a patent therefore.

For some time service stations, garages, and the like have most generally employed vehicle lifts of the type using one or two vertically positioned fluid cylinders for providing the vertical movement. The cylinder itself extends below the floor with only the vertically moving elements being positioned above the floor. More recently there has been an increasing demand for a vehicle lift with all its components mounted above the floor. In the main, such lifts are employed where the work on the vehicles is limited to the tires, wheels, and adjacent components. Such lifts only raise the vehicles a few feet in the air and are substantially less expensive, installed, than are the lifts employing large vertical fluid cylinders.

Lifts of this newer type generally employ a vertically moving frace or bolster to which is pivotally secured four car engaging arms. These arms extends outwardly from the bolster to the proper lift points for the vehicles being raised. The bolster is supported on a plurality of pivoted links, with the links pivoting from a generally horizontal to an upright position to raise the bolster. Pivoting of the links is achieved by one or more fluid cylinders.

A principal object of the present invention is to ameliorate the problem of damage to the pivot points of the bolster supporting links which is caused by the torsional loading applied thereto by the vehicle supporting arms. In some such types of lifts this problem is so severe that the pivotal joints will actually freeze up after only months of use. The reason for this, as I have discovered, is that the structure is designed in a manner such that the pivot points are relied upon to directly resist the torsional loading. In the apparatus I have devised, this torsional load is removed from the pivot points for all practical purposes.

Another feature of my invention is that extremely low silhouette when collapsed (lowered). This is important to the used of such lifts because of the low clearance on many automotive vehicles. If the clearance is inadequate, some vehicles cannot be raised and/or there is always the danger of damage to a particularly low vehicle when it is driven to a position over the lift. Embodiments of the present invention are produced which extend no higher than 3⅜ inches above the floor when collapsed. This is approximately equal to the diameter of the fluid cylinder employed in operating the lift. Such embodiments will rais a load of 6,000 to 8,000 pounds a distance of 30 inches above the floor.

Further obects and advantages will become apparent from the following description taken in conjunction with the drawings in which:

FIGURE 1 is a perspective view illustrating an embodiment in raised position with an automobile supported thereon;

FIGURE 2 is a perspective view of the embodiment in lowered position;

FIGURE 3 is a perspective view of the embodiment in raised position but without the vehicle thereon;

FIGURE 4 is a plan view of the embodiment; and

FIGURE 5 is a partial section as viewed at line 5—5 of FIGURE 4.

Although the following disclosure offered for public dissemination is detailed to ensure adequately and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing ou the parts, improvements, or combinations in which the inventive concepts are found.

In the illustrated embodiment there is a floor supported base, generally 10, to which are pivotally connected three legs of links 11, 12 and 13. These links also are pivotally connected to a movable frame or bolster generally 14. Pivotally attached to frame 14 are four vehicle supporting arms generally 15. The force for pivoting the links and thus raising the bolster is supplied by a fluid cylinder generally 16.

Frame 14 comprises two ends 17 and 18, and two sides 19 and 20. These are formed by structural members suitably welded together. Link 12 is pivotally secured to end 18 by a pin 22 and pivotally connected to base 10 by pin 23. Similarly link 11 is pivotally connected by pins 24 and 25 to end 18 and base 10 respectively. Link 13 is connected to end 17 by pin 26 and to base 10 by pins 27 and 28.

End 17 has a plurality of spaced blocks 31 welded thereto and forming a part thereof. These blocks are drilled to form journals receiving pin 26. The end of link 13 is formed by a plurality of spaced projections 32, which likewise form journals for pin 26 and are interdigitated with blocks 31. Projections 32 are angularly positioned with respect to the main portion 33 of link 13. Link 13 also includes a base portion 34 having journaled bosses 35 to receive pins 27 and 28. Journaled bosses 36 form a part of base 10 being secured to end member 37 thereof. Because of the angular positioning of projections 32, a line connecting pin 26 and pin 27 (or 28) lies above the longitudinal axis of the main portion 33 of link 13. As will be seen, the structure and mounting of links 11 and 12 generally correspond to that of link 13. The mounting of the links is such that they form parallel linkage means to support the bolster 14 on base 10.

In addition to end member 37, base 10 includes a pair of longitudinal members 38 and 39, a central member 40, and an end member 41. Longitudinal member 39 has a plurality of blocks 42 welded thereto. Blocks 42 form abutments for end 43 of safety brace 44. The other end of safety brace 44 is pivotally mounted on pin 45 held by blocks 46 of end 17 of the bolster. As best illustrated in FIGURE 3, safety brace 44 is used to bear against one of the abutments 42 and maintain the lift in the raised position in the event of accidental loss of pressure, etc., in fluid cylinder 16. When the lift is to be lowered, safety brace 44 is merely pivoted upwardly to be clear of the abutments 42.

The piston rod of fluid cylinder 16 has a journaled boss 48 on the end thereof to receive pin 45. The end of the cylinder has a base plate 49 that is received in a socket defined by spaced abutments 50 and 51. Abutments 50 and 51 form a part of base 10. Thus when fluid is supplied to cylinder 16 under pressure through hose 52 (FIGURE 3) the piston rod is extended. The pivot points for the cylinder 16, i.e. pin 45 and the contact between base plate 49 and abutment 51, are offset at opposite sides of the longitudinal axis of the cylinder 16 (see particularly FIGURE 5). This results in an upward component of force even when the lift is in the collapsed position of FIGURES 2, 4 and 5. This plus the fact that the pivot points of the links, e.g. pins 26, 27, 28, are already angularly disposed with respect to the horizontal, enables the lift to commence rising from the collapsed position. These are significant factors in having a workable lift that has an extremely low silhouette in the collapsed position.

The arms 15 have two longitudinal slots 55 and 56 therein which are divided at approximately the center of the arm by cross brace 57. Slot 55 is closed at the opposite end by connector 58, while slot 56 is closed at the outer end by connector 59. The car support pads 60 are welded to plates 61. Extending transversely below arms 15 are pins 62 secured to plates 61 to hold the plates 61 in slots 56. As best seen in FIGURES 4 and 5, plates 61 have a thickness substantially smaller than the width of slots 56 but with the other transverse dimension being larger than the width of slots 56. This permits the support pads 60 to be cocked with respect to the arms 15, as illustrated in FIGURES 4 and 5. At the same time the pads are not free to rotate with respect to the arms. The ability to raise the pads and cock them to a limited degree with respect to the arms facilitates reaching the proper contact points for various vehicles.

The arms 15 are secured to the frame 14 by headed pins 64. These pins or bolts extend through slots 55 in the arms and are secured to frame 14 as by means of threads. Arms 15 are free to rotate on the headed pin 64 and may slide longitudinally within the limits of slot 55. An important feature of this invention is that the pivot points formed by headed pin 64 lie outboard of the pivotal connections (22, 24, 26) of the links with the frame 14. Thus with the arms 15 extending outwardly, as in FIGURES 2 and 3, and with the load of the vehicle imposed upon pads 60 there is a torsional load imposed on frame 14. This load is free to twist frame 14 within its elastic limits, and such twisting is resisted primarily by the frame itself.

The cross section of the frame 14 between the pivot points is no less substantial than that outboard of the pivot points. Torsional stiffness is a function of the cube of the dimensions. Thus, quite apart from any resistance to bending supplied by the supports, the frame would have a tendency to bend only very little in the area between the pivot points of the links. The majority of the movement due to flexure will appear outboard of the pivot points in the frame. Thus these pivot points of the links, pins 22, 24 and 26, have a comparatively small imposed on them (apart from the solely vertical force) as a result of the torsional forces applied to the frame by the outwardly extended loaded arms. This is quite a different situation from the commercially employed, link type lifts, wherein the link pivot points are substantially in line with the arm attachments. In that case the torsional load, instead of being resisted by the frame itself, is imposed almost entirely on the link pivot points, and failure of the link pivots is inordinately rapid.

I claim:

1. In a vehicle lift of the type having four vehicle supporting arms which are raised and lowered by a plurality of link means having two ends with one end thereof supported on a base for pivotal movement about approximately horizontal axes and moved between a generally horizontal position and an upright position by a fluid cylinder device, the improvement comprising: vertically moveable rigid frame means having two sides and two ends, said frame means being supported on the other ends of said link means with the link means being pivotally connected to the frame means with a pivotal connection being to a first portion of said frame means inboard of said sides, said arms being pivotally connected to a second portion of said frame means for movement about generally vertical axes, said second portion of said frame being fixed to and outboard of said first portion.

2. In a vehicle lift as set forth in claim 1, wherein the frame means includes two side members and two end members attached to the side members, said arm pivotal connections being on said side members, said other ends of said link means being in load bearing engagement with said end members.

3. In a vehicle lift as set forth in claim 2, wherein said other ends are pivotally connected to said end members, and pivotally connected to the base for parallel movement of the link means.

4. In a vehicle lift as set forth in claim 3, wherein said link means at one end of the frame means are two spaced apart links, the portion of the frame means between said links at said end of the frame means having a section no less substantial than that of the frame means outboard of said links at said end of the frame means.

5. In a vehicle lift as set forth in claim 4, wherein the links have an upward offset at one end thereof with the pivotal connection of the links at said end being on said offset whereby the longitudinal axis of the link is below a line between the two pivotal connections of the links.

6. In a vehicle lift as set forth in claim 2, wherein said link means at one end of the frame means comprises two parallel apart links pivotally connected to the base and the frame means and positioned at opposite sides of the center of said one end, said link means at the other end of the frame means having a plurality of spaced journals interdigitated with a plurality of spaced journals on the frame means, pin means pivotally connecting said journals, said journals being centered at said other end, said link means on said other end being pivotally connected to the base and parallel to said links.

7. In a vehicle lift as set forth in claim 6, wherein said device is pivotally connected at one end thereof to said other end of said frame means, extends between said spaced links and is pivotally connected to said base beyond said one end of said frame means.

8. In a vehicle lift as set forth in claim 7, wherein said pivotal connections of said device are offset on opposite sides of the axis of the device.

9. In a vehicle lift as set forth in claim 8, wherein the links have an upward offset at one end thereof with the pivotal connection of the link at said end being on said offset whereby the longitudinal axis of the link is below a line between the two pivotal connections of the link.

10. In a vehicle lift as set forth in claim 1, wherein each arm has two parallel slots extending therethrough from top to bottom, one slot extending from a point adjacent one end of the arm to approximately the midpoint of the arm, the other slot extending from a point adjacent the other end of the arm to approximately the midpoint of the arm, a vertical pin secured to the frame means and extending upwardly through said one slot to form the pivotal connection between the arm and frame means, said pin having an enlarged head above said arm, and a vehicle support pad having a portion extending through the other slot and holding said pad to said arm while allowing the pad to be moved longitudinally of said arm.

11. In a vehicle lift as set forth in claim 10, wherein said pad portion is substantially narrower in width than the width of the other slot to permit said pad to be turned angularly with respect to said arm, said pad portion being substantially greater in the other transverse direction than the width of the slot.

12. In a vehicle lift of the type having a plurality of arms pivotally connected to a bolster, the improvement comprising each arm having two parallel slots extending therethrough from top to bottom, one slot extending from a point adjacent one end of the arm to approximately the midpoint of the arm, the other slot extending from a point adjacent the other end of the arm to approximately the midpoint of the arm, a vertical pin secured to the frame means and extending upwardly through said one slot to form the pivotal connection between the arm and frame means, said pin having an enlarged head above said arm, and a vehicle support pad having a portion extending through the other slot and holding said pad to said arm while allowing the pad to be moved longitudinally of said arm, said portion being substantially narrower in width than the width of the other slot to permit said pad to be turned angularly with respect to said arm, said portion being substantially greater in the other transverse direction than the width of the slot.

References Cited

UNITED STATES PATENTS 3,317,004   5/1967   Harrison _____ 187—8.5

FOREIGN PATENTS 768,388   2/1957   Great Britain.

EVON C. BLUNK, Primary Examiner.

H. C. HORNSBY, Assistant Examiner.